US006130374A

United States Patent [19]

Polidori

[11] Patent Number: 6,130,374

[45] Date of Patent: Oct. 10, 2000

[54] STRINGED INSTRUMENT SPEED PICK

[76] Inventor: Anthony Polidori, 1507 Rivershores Way, Tampa, Fla. 33603

[21] Appl. No.: 09/209,514

[22] Filed: Dec. 10, 1998

Related U.S. Application Data

[60] Provisional application No. 60/068,708, Dec. 27, 1997.

[51] Int. Cl.$^{7}$ .......... G01D 3/16

[52] U.S. Cl. .......... 84/322; 84/320

[58] Field of Search .......... 84/320, 321, 322

[56] References Cited

U.S. PATENT DOCUMENTS 1,184,561 5/1916 Napoletano .......... 84/322

1,461,070 7/1923 Rudesyle .......... 84/322

*Primary Examiner*—Robert E. Nappi

*Assistant Examiner*—Shih-yung Hsieh

[57] ABSTRACT

A guitar pick for more accurately plucking the strings of a musical instrument having generally a main body or support member with cavities embedded therein allowing a player to obtain a more secure grip. A frustoconical section having a base side and a pointed side is affixed to one side of the main body whereby the tip of the cone is used to pluck the strings of the guitar. The frustoconical end is either rigidly affixed or removable affixed to allow different cones to be installed for different style play. Different angled tips of the cones produce different sounds for different styles of play. Grooves running parallel or perpendicular to the lengthwise axis of the cone also can produce different sounds.

5 Claims, 12 Drawing Sheets

STRINGED INSTRUMENT SPEED PICK

This Appln claims benefit of Provisional Appln No. 60/068,708 Dec. 27, 1997.

BACKGROUND OF THE INVENTION

1. Field of the Invention

Generally, this invention is directed toward a new device for plucking stringed instruments. More specifically, this device is an instrument pick that allows faster and more accurate plucking of a stringed musical instrument.

2. Description of the Prior Art

One of the problems that has been noticed with stringed instruments guitars is the difficulty that arises when the strings are plucked by either the fingers or a conventional guitar pick. When slow notes are played, a player can pluck the guitar strings fairly accurately; however, when fast repetitious notes are attempted, the fingers or conventional flat guitar picks do not seem to accurately pluck the strings at the required speed.

For the foregoing reasons, there is a need for a new and improved device that will allow a stringed instrument to be plucked in a more accurate manner especially during notes that require high speed or high rhythmic action. It is therefore an object of this invention to provide a guitar pick that can more accurately pluck the strings of a musical guitar especially when speed is required.

SUMMARY OF THE INVENTION

The present invention is directed towards a stringed instrument speed pick having a frustoconical side used for plucking the strings of a musical instrument. The pick generally contains a main body or support member for allowing a place for the fingers to grip. A cone is affixed to one side of the main body whereby the tip of the cone is used to pluck the strings of the guitar. Some embodiments of the cone have pointed tips, some with rounded tips, some with surface grooves positioned parallel with the length wise axis of the cone, and some with surface grooves positioned perpendicular to the length wise axis of the cone.

Accordingly, it is therefore an object of this invention to provide a guitar pick that can more accurately pluck the strings of a musical guitar instrument especially when speed is required (trill).

Another object of this invention is to provide a guitar pick that provides a main body allowing the fingers to obtain a secure grip during play.

A further object of this invention is to provide a guitar pick having a frustoconical end used for plucking the string portion of a guitar.

Still a further object of this invention is to provide a guitar pick having the frustoconical end removable affixed to the body portion of the pick thereby allowing different angled cones to be affixed to the body. Note different angled cones and rounded tips of the cones produce a different sound and feel for musical instruments.

Another object of this invention is to provide a guitar pick having a main body with formed depressions on both sides of the main body allowing the fingers to obtain a more secure grip and to allow the cone section to be attached at different angles along the perimeter of the body. The different angles, pitch size and placement of the cone to the main body allows the pick to suit virtually any and all individual styles of play. The attachment of different angles allows for the wrist of the player to assume a different posture for different styles of play. The pitch, angle, size, and placement of the cone on the main body will virtually fit any individual style of play.

A further object of this invention is to provide a guitar pick having the tip of the frustoconical end rounded off to produce a smooth style of play (example: for playing mandolins in either a fast strum or trill fashion) or pointed which would primarily be used for rock style play.

Other objects and a fuller understanding of the invention will become apparent from reading the following detailed description of a preferred embodiment in conjunction with the accompanying drawings.

BRIEF DESCRIPTION OF THE DRAWINGS

This invention, together with other objects, features, aspects and advantages thereof, will be more clearly understood from the following description, considered in conjunction with the accompanying drawings.

Six sheets of drawings are furnished: Sheet one contains FIG. 1; sheet two contains FIG. 2; sheet three contains FIG. 3; sheet four contains FIG. 4; sheet five contains FIG. 5; sheet six contains FIG. 6; and sheet seven contains FIG. 7.

FIGS. 12A and 12B are front and side elevational views of the stringed instrument speed pick with the frustoconical member at one angle while FIGS. 13A and 13B are showings similar to FIGS. 12A and 12B but with the frustoconical member at a different angle while

LIST OF ELEMENTS

1. STRINGED INSTRUMENT SPEED PICK
2. MAIN BODY
3. PERIMETER EDGE

4. TOP FRONT SURFACE
5. CONE BODY
6. CONE TIP OR POINT
7. BASE OF CONE
8. FRONT DEPRESSION GRIPPING SURFACE
9. MIDDLE DEPRESSION GRIPPING SURFACE
10. REAR DEPRESSION GRIPPING SURFACE
11. REAR BOTTOM SURFACE
12. BOTTOM OF GROOVE
13. PEAK OF GROOVE
14. ALTERNATIVE CONE POSITION
15. PITCH ANGLE OF CONE
16. GROOVE
17. ANGLE OF CONE

DESCRIPTION OF THE PREFERRED EMBODIMENTS

Figure 1:
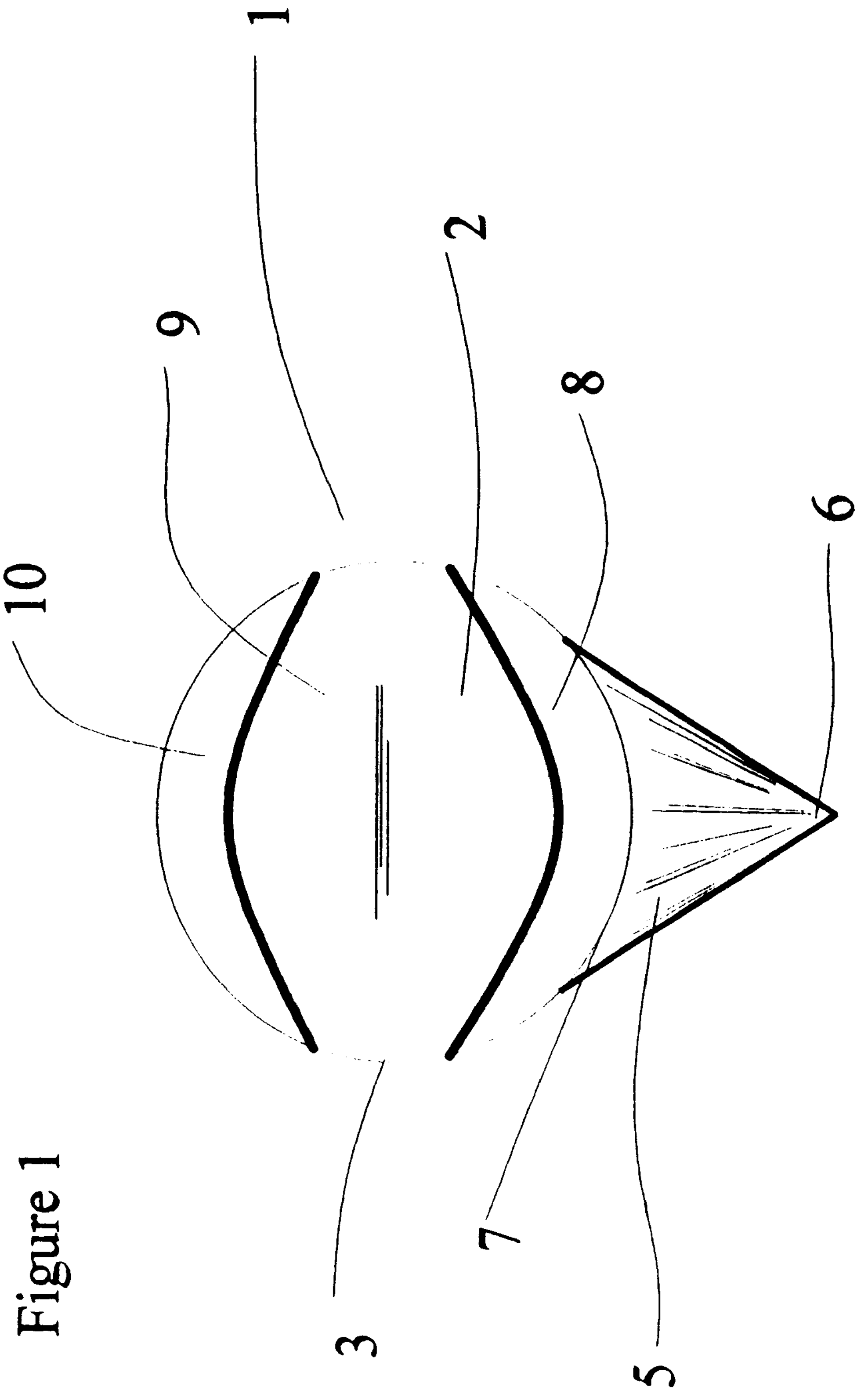
FIG. 1 is a top view of the guitar pick.
Figure 2:
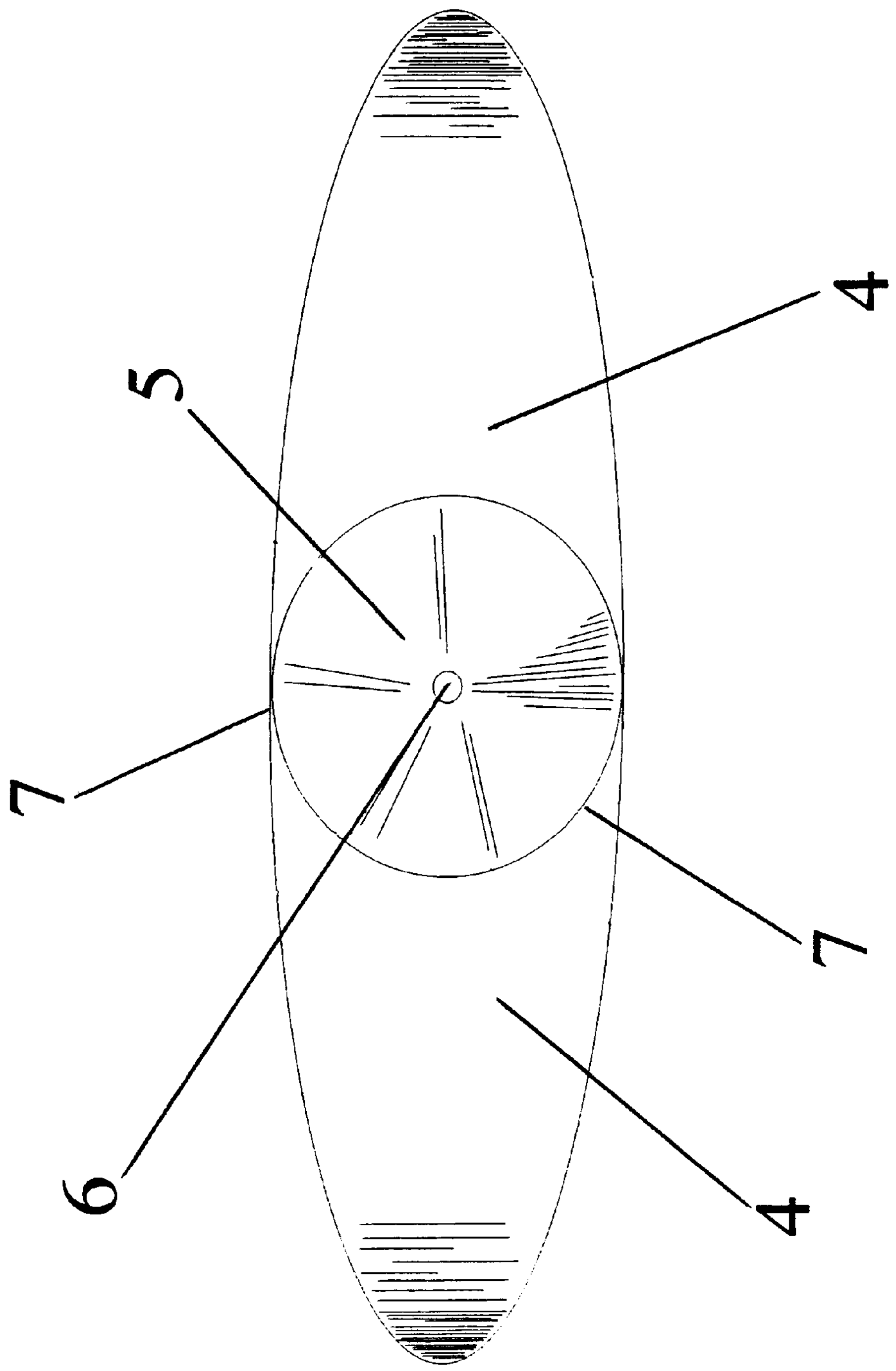
FIG. 2 is a frontal view of the guitar pick displaying the pointed end of the cone.
Figure 3:
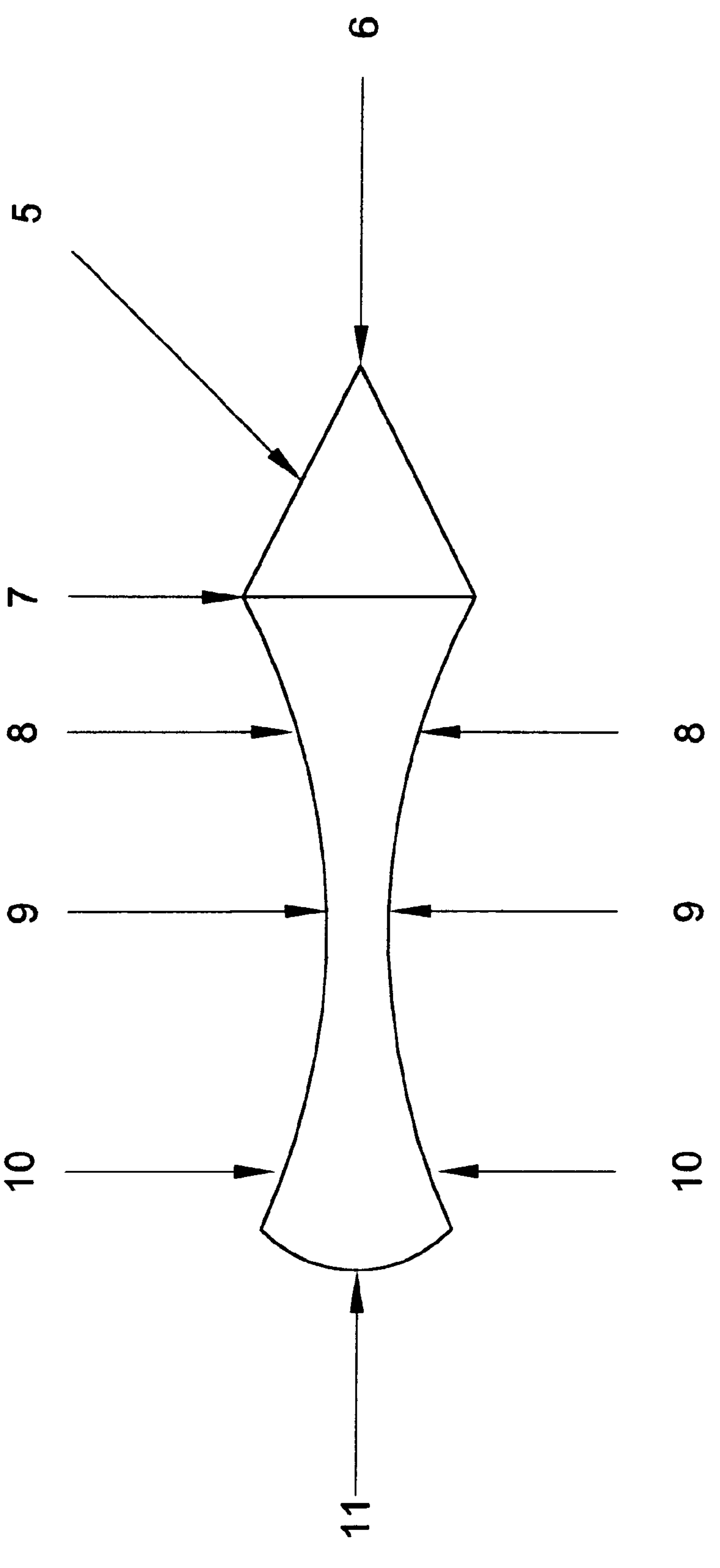
FIG. 3 is side view of the guitar pick showing the thickness and the depressions used for obtaining a secure grip. Also, the arrow 17 designates the pitch angle of the cone.
Figure 4:
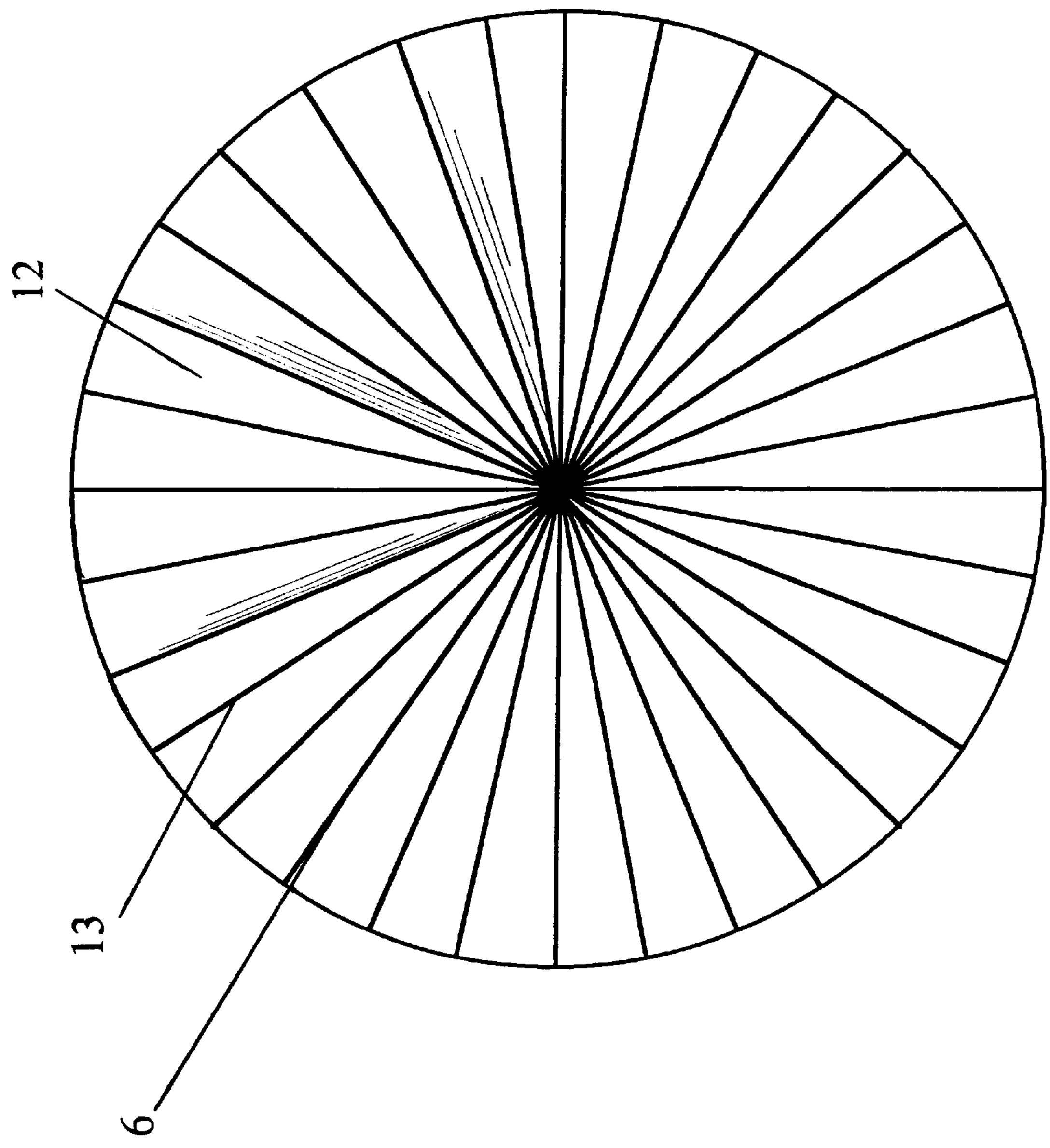
FIG. 4 is a magnified top view of only the cone section looking down from the top and displaying the grooves (12,13) along the cone.
Figure 5:
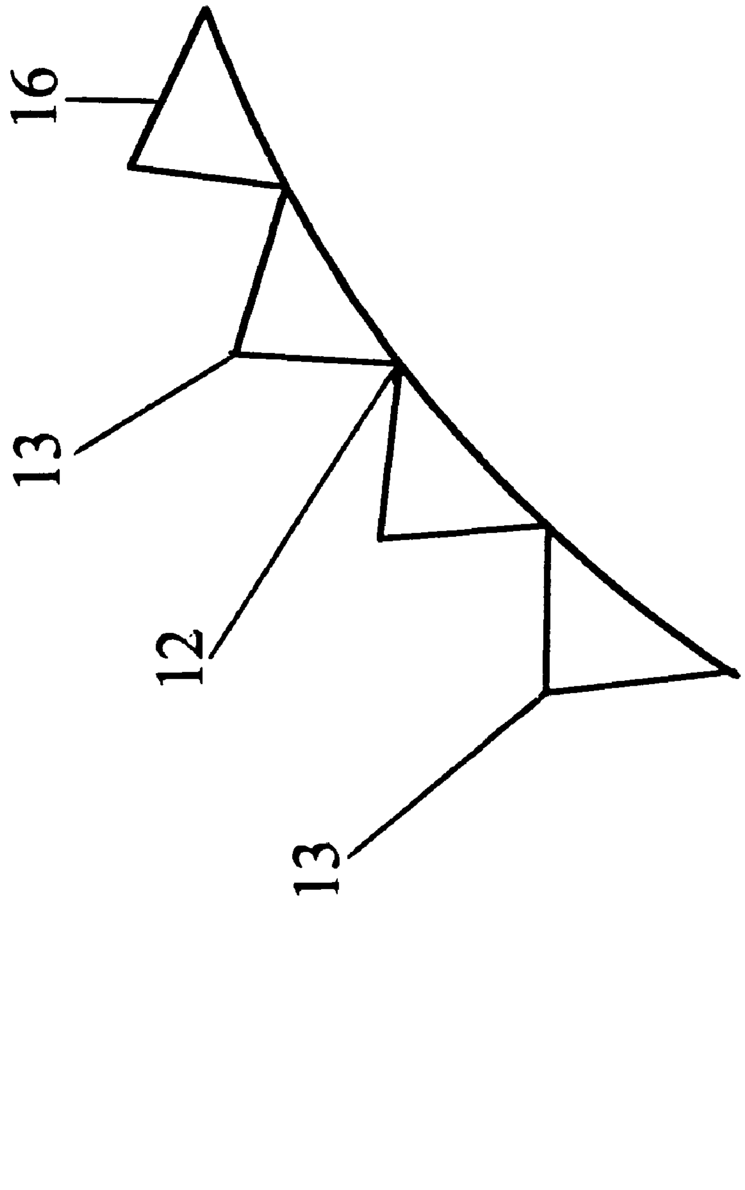
FIG. 5 shows a magnified cross sectional and portional view of the grooves (12,13) of the cone that are used for giving a different sound to the guitar.
Figure 6:
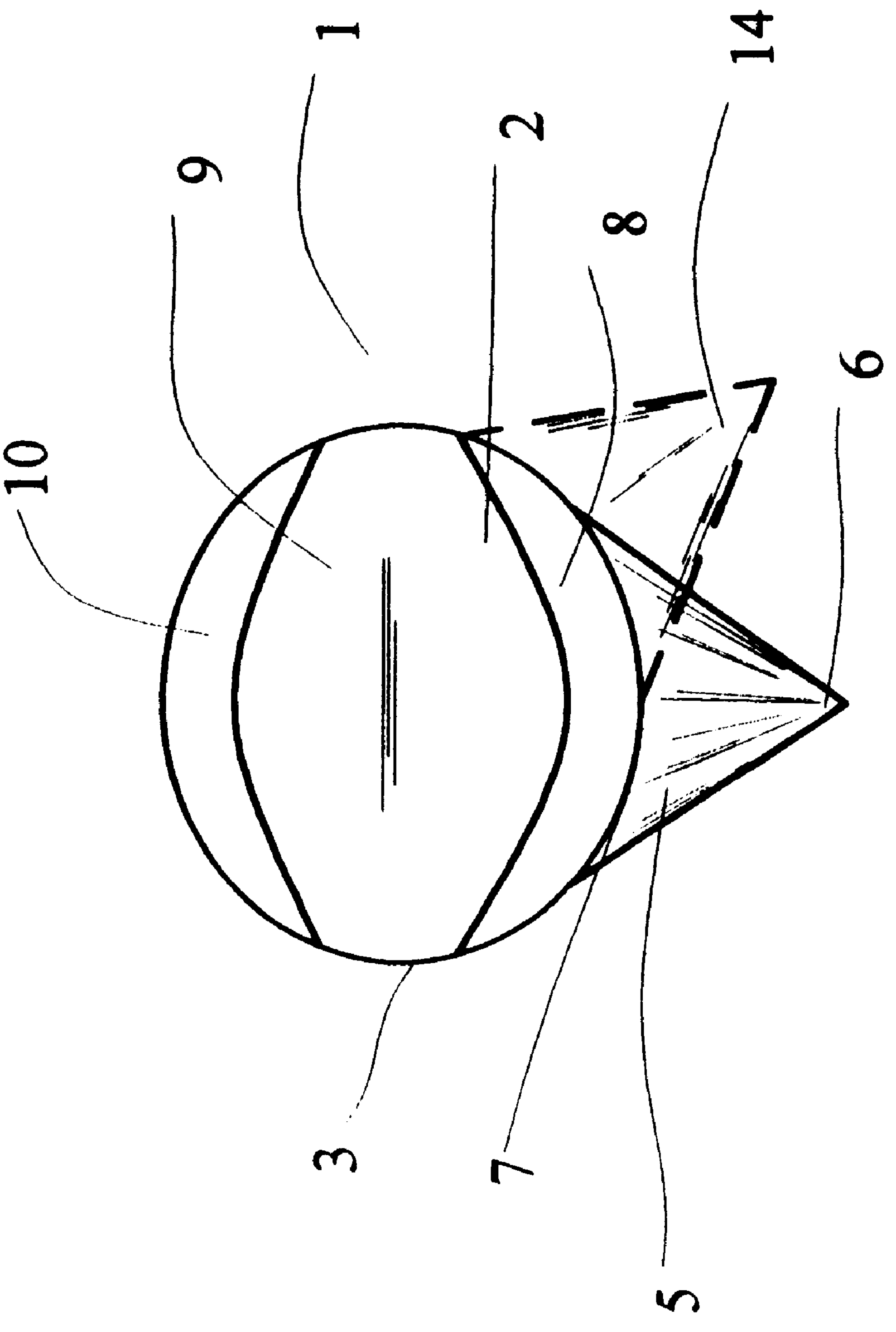
FIG. 6 shows an alternative top view of FIG. 1 showing how the cone section can be affixed at different positions along the perimeter of the main body. This allows for the player to attack the strings at different wrist angles.
Figure 7:
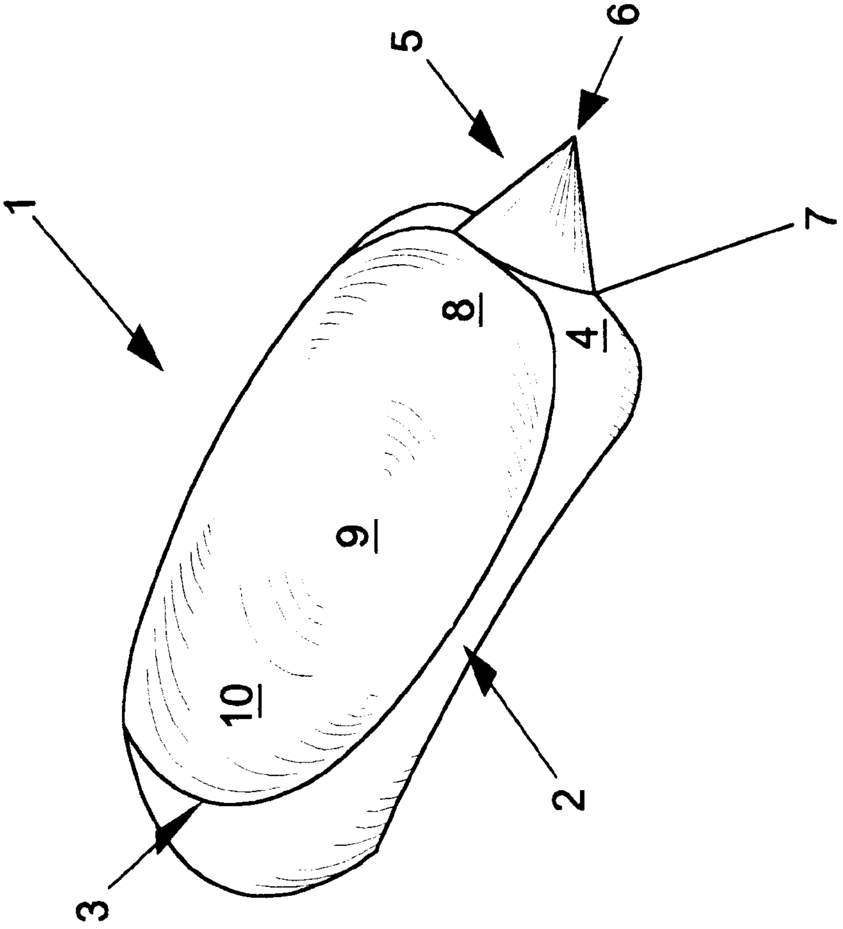
FIG. 7 is a perspective illustration of the stringed instrument speed pick as shown in FIGS. 1, 2 and 3.
Figure 8A:
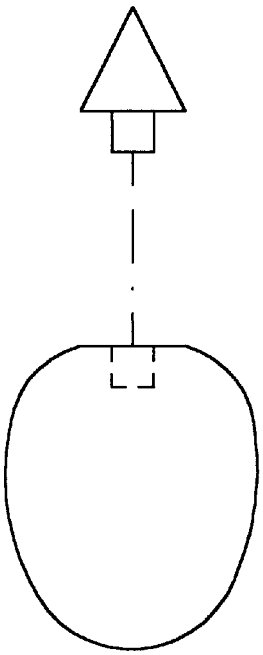
FIGS. 8A and 8B illustrate the embodiment with the frustoconical member separable from the main body as described in the specification.
Figure 8B:
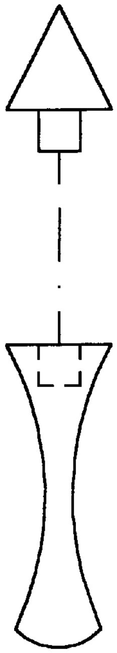
Figure 9B:
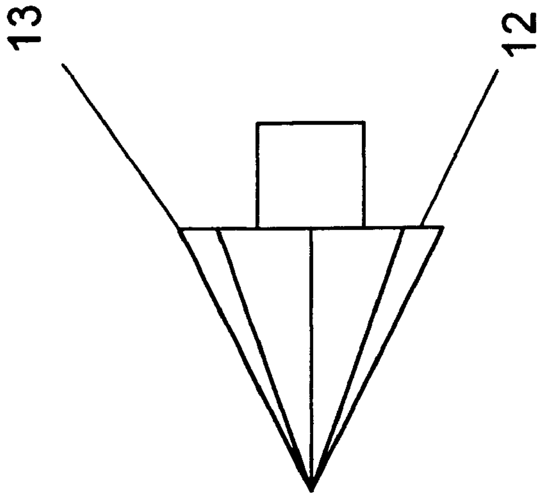
FIGS. 9A and 9B illustrate a frustoconical member with a front view and a side view showing the embodiment with the linear grooves.
Figure 9A:
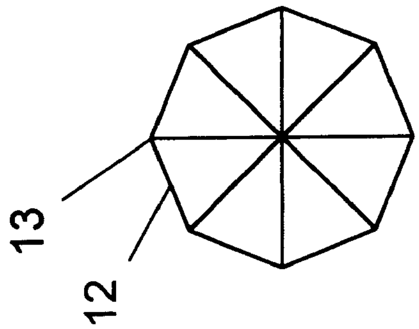
Figures 10A, 10B, 10C, 10D:
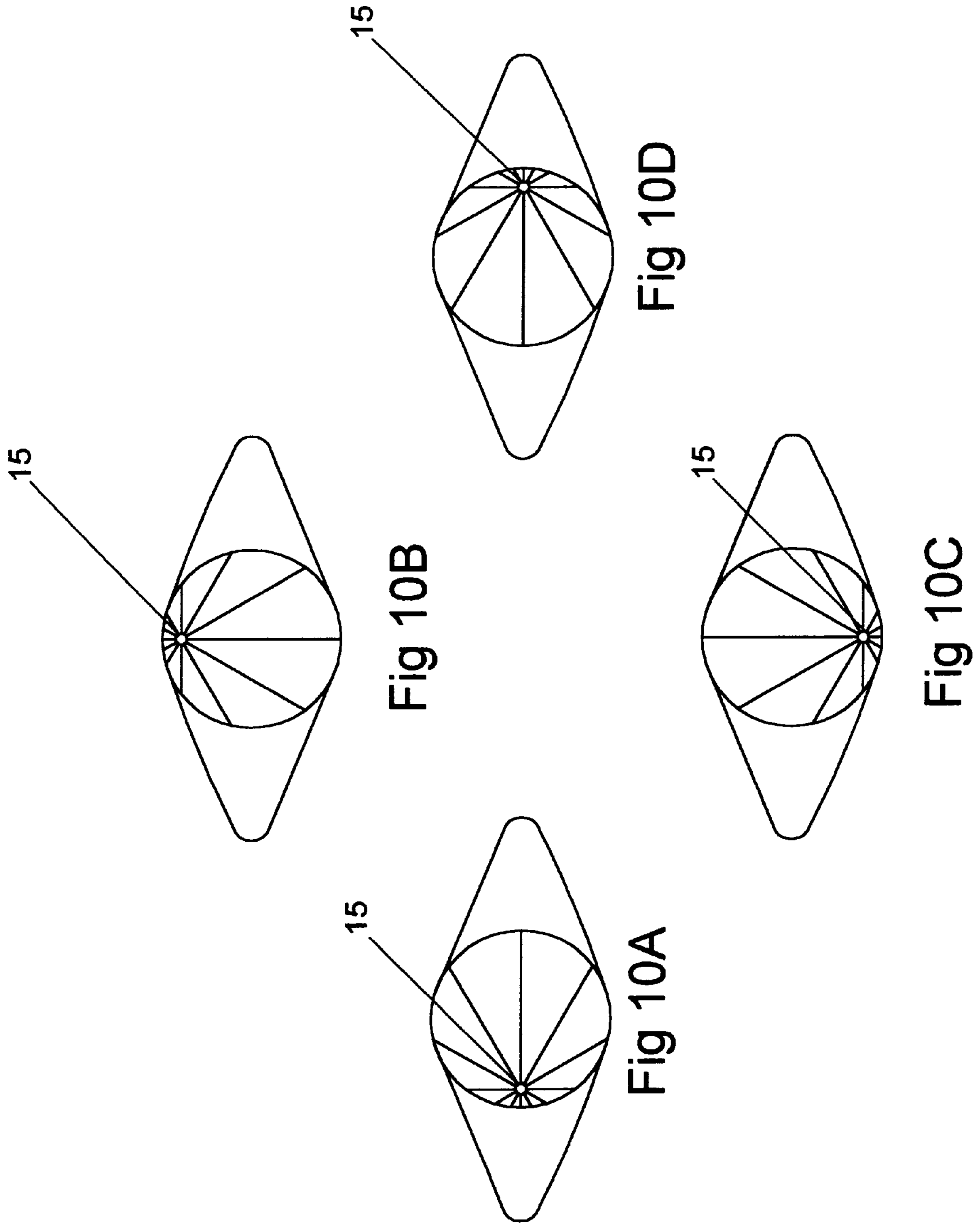
FIGS. 10A, 10B, 10C and 10D are front elevational views of the embodiment shown in FIG. 6.
Figure 11:
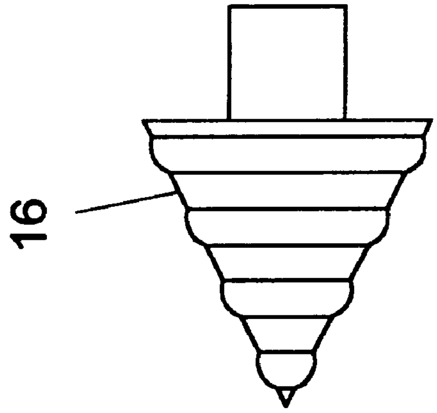
FIG. 11 is a side elevational view of the embodiment with the plurality of grooves in a circular configuration as described in the specification.
Figure 14A:
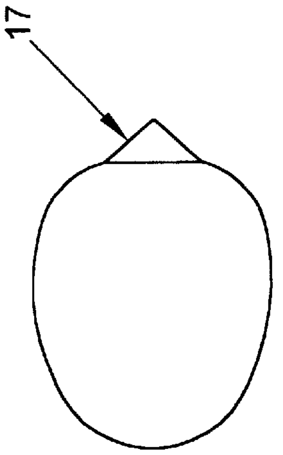
FIGS. 14A and 14B are similar showings but with the frustoconical member at yet a different angle.
Figure 14B:
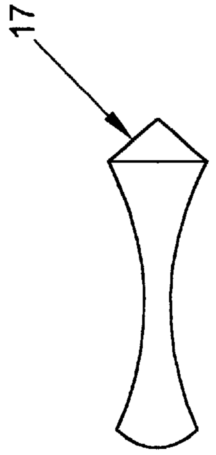
Figure 13A:
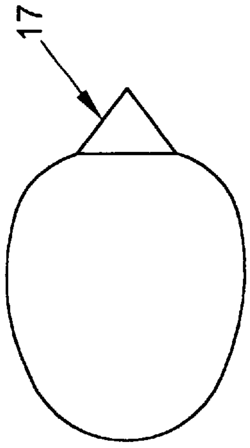
Figure 13B:
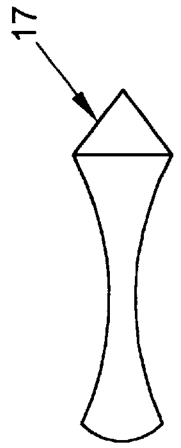
Figure 12A:
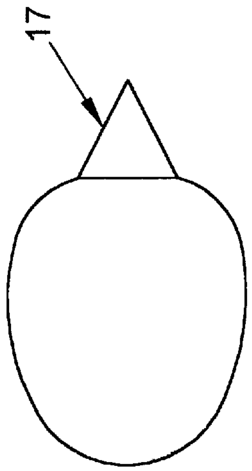
Figure 12B:
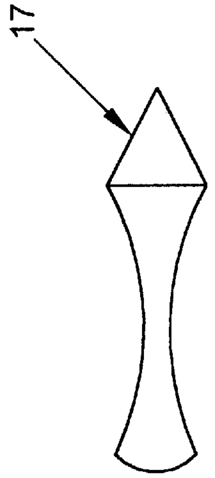

Referring now to FIGS. 1–3, a device for plucking the strings of a musical instrument referred to generally by reference numeral 1. The apparatus 1 is made up primarily of a supporting or body member 2, with a perimeter edge 3, and a frustoconical member 5 with the base side 7 affixed to the perimeter edge 3.

The body member 2 contains depressions 9 on the top and bottom side to allow players fingers to obtain a more secure grip during play.

The tip of the frustoconical member 6 is shown in the figures having a point configuration. It should be noted that a more rounded tip will produce a smoother sound of play with the pointed tip as shown used for rock style play.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A device for plucking the strings of a stringed musical instrument, said device comprising:

a) a one piece supporting main body, said main body having a substantially elliptical configuration with a front side, a back side, a thickness, and a perimeter, said front side and said back side each having an arcuate depression to accommodate the fingers of a player; and b) a frustoconical member having a base end and a pointed end, said base end being affixed to said main body.

2. A device as set forth in claim 1 wherein said base end is removably affixed to said main body for being interchanged by a user.

3. A device as set forth in claim 1 wherein said frustoconical member has a plurality of grooves, each in a linear configuration on its surface to allow for varying the tone of a stringed instrument when strummed.

4. A device as set forth in claim 1 wherein said frustoconical member has a plurality of grooves on its exterior surface in a circular configuration perpendicular to the length wise axis of said frustoconical member to allow for increased rapidity of notes when plucking a stringed instrument.

5. A device as set forth in claim 1 wherein said base end is integrally formed with said main body.

* * * * *